United States Patent
Bohr et al.

(10) Patent No.: US 8,556,519 B2
(45) Date of Patent: Oct. 15, 2013

(54) RADIAL ROLLER BEARING, IN PARTICULAR SINGLE TRACK BALL ROLLER BEARING

(75) Inventors: Andreas Bohr, Herzogenaurach (DE); Uli Grosskopf, Adelsdorf (DE); Dieter Jauernig, Herzogenaurach (DE); Herbert Rost, Herzogenaurach (DE); Uwe Wunderlich, Graefenberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 231 days.

(21) Appl. No.: 13/131,436

(22) PCT Filed: Nov. 27, 2009

(86) PCT No.: PCT/EP2009/065980
§ 371 (c)(1),
(2), (4) Date: May 26, 2011

(87) PCT Pub. No.: WO2010/063651
PCT Pub. Date: Jun. 10, 2010

(65) Prior Publication Data
US 2011/0229068 A1    Sep. 22, 2011

(30) Foreign Application Priority Data
Dec. 6, 2008  (DE) .......................... 10 2008 060 957

(51) Int. Cl.
*F16C 33/46*    (2006.01)
(52) U.S. Cl.
USPC .......................................... 384/572; 384/568
(58) Field of Classification Search
USPC ................... 384/568, 523, 533, 572
See application file for complete search history.

(56) References Cited

U.S. PATENT DOCUMENTS

| 1,438,654 | A |   | 12/1922 | Leon |           |
|-----------|---|---|---------|------|-----------|
| 2,861,849 | A | * | 11/1958 | Case | 384/527   |
| 3,020,106 | A | * | 2/1962  | Mims | 384/568   |
| 4,118,259 | A | * | 10/1978 | Bingle et al. | 156/73.1 |
| 4,741,632 | A | * | 5/1988  | Jacobson | 384/491 |
| 4,902,145 | A | * | 2/1990  | Johnson | 384/530 |
| 7,891,880 | B2 | * | 2/2011 | Hofmann et al. | 384/568 |
| 8,047,723 | B2 | * | 11/2011 | Hofmann et al. | 384/568 |
| 2004/0120623 | A1 | * | 6/2004 | Murai et al. | 384/568 |

FOREIGN PATENT DOCUMENTS

| CN | 101025191 A | 8/2007 |
| DE | 168499 C | 3/1906 |
| DE | 43 34 195 A1 | 3/1994 |
| DE | 10 2005 059 032 A1 | 6/2007 |
| DE | 10 2007 002 328 A1 | 7/2008 |
| FR | 523 164 A | 8/1921 |
| WO | WO 2007065415 A1 * | 6/2007 |
| WO | WO 2007121710 A1 * | 11/2007 |

* cited by examiner

*Primary Examiner* — Thomas R Hannon
(74) *Attorney, Agent, or Firm* — Lucas & Mercanti, LLP

(57) ABSTRACT

A radial roller bearing, in particular a single-track ball roller bearing, which has an outer bearing ring with an inner groove track, an inner bearing ring with an outer groove track and ball rollers, which are disposed parallel to one another and held in a peripheral direction at even distances from one another by a plastic bearing cage, that roll between the bearing rings in the groove tracks. Each roller has two lateral surfaces that are flattened symmetrically from a spherical base form and a defined axial tilting clearance. The cage has two axially separated, pocketed cage halves which can be assembled in a positive-fitted, form-locked or integral fashion by opposing connecting elements.

7 Claims, 2 Drawing Sheets

RADIAL ROLLER BEARING, IN PARTICULAR SINGLE TRACK BALL ROLLER BEARING

This application is a 371 of PCT/EP2009/065980 filed Nov. 27, 2009, which in turn claims the priority of DE 10 2008 060 957.9 filed Dec. 6, 2008, the priority of both applications is hereby claimed and both applications are incorporated by reference herein.

FIELD OF THE INVENTION

The invention relates to a radial roller bearing, in particular, single track ball roller bearings for high speeds and low noise level requirements, such as in motor vehicle transmissions or within a secondary drive of internal combustion engines.

BACKGROUND OF THE INVENTION

It is generally known in roller bearing technology that the radial roller bearings which are used most frequently are single track and multiple track groove ball bearings, since they are distinguished above all by an equally high radial and axial loadbearing capacity and have the highest rotational speed limits of all radial bearings on account of their low friction. The groove ball bearings comprise substantially an outer bearing ring and an inner bearing ring and a number of balls, which are arranged between the bearing rings as rolling bodies, which roll groove-shaped raceways in the inner side of the outer bearing ring and in the outer side of the inner hearing ring and which are guided at uniform spacings from one another by a bearing cage. Here, the radial ball bearings are filled with the balls by the eccentric mounting method which has been disclosed by DE 168 499 and in which the two bearing rings are arranged eccentrically with respect to one another and the free space which is produced as a result between the bearing rings is filled with the balls.

However, it has been shown in practice that limits are nevertheless placed on groove ball bearings of this type in relation to the loadbearing capacity of the bearing on account of the low maximum number of balls which can be installed and/or the low maximum filling level of approximately 60%. In the past, a multiplicity of solutions were therefore proposed, in which the number of balls and, therefore, the loadbearing capacity of groove ball bearings was to be increased, for example, by the arrangement of filling openings in the raceways. Moreover, another possibility to increase the number of rolling bodies on a radial roller bearing has been disclosed by DE 43 34 195 A1. In this radial roller bearing, which is formed per se as a single track groove ball bearing, the rolling bodies are not formed by balls, but rather by what are known as ball rollers, which are configured as balls with two side faces, which are flattened symmetrically from a basic ball shape and are arranged parallel to one another. Here, the width of the ball rollers between their side faces is smaller than the spacing between the inner side of the outer bearing ring and the outer side of the inner bearing ring. As a result, during filling of the bearing, the ball rollers can be introduced into the bearing, axially with respect to the bearing, through the spacing between the inner ring and the outer ring and can then be rotated by 90° into the raceways of the bearing rings. Since smaller spacings can be achieved between the individual rolling bodies as a result of this mounting method, a higher number of rolling bodies overall can therefore be introduced into the radial roller bearing.

However, since, in ball roller bearings of this type exact axial guidance of the ball rollers is required and, above all, automatic rotation of the ball rollers transversely with respect to the running direction is to be avoided during bearing operation, a plurality of embodiments of corresponding bearing cages are also proposed in the document cited last. Here, one cage embodiment, which is particularly suitable for applications with low noise requirements, is a plastic snap action cage which is open on one side and comprises a circumferential solid-walled side ring with pocket webs which extend axially away from it on one side and merge at the level of a plane which is defined by the center points of the ball rollers into two elastically yielding pocket tabs. Here, the pocket tabs are spaced apart from one another by an intermediate space and form in pairs a plurality of cage pockets which spatially surround the running faces of the ball rollers.

However, it has proven disadvantageous that the entire kinematic behavior of the ball rollers which occurs at different bearing loadings has not been taken into consideration in a snap action cage which is configured in this way. It has thus been determined, for example, that ball rollers as rolling bodies in radial roller bearings roll without offsetting movements stably in their raceways at relatively high speeds and uniform load on account of the gyroscopic effect which occurs, and do not require any axial guidance by the bearing cage. If, however, the bearing rotational speed drops below a permissible minimum rotational speed or the bearing is suddenly accelerated greatly, what is known as a tumbling effect occurs, in particular, in the loadfree zone of the bearing. During the tumbling effect, the ball rollers tend to roll in their raceways in an undulating manner transversely with respect to the running direction. Here, first contact occurs between the running faces of the ball rollers and the side ring of the snap action cage. By way of this contact, friction heat is generated and the contact is the cause of a disadvantageous rise in the operating temperature in the radial roller bearing. Here, the friction between the ball rollers and the bearing cage and the tumbling movements of the ball rollers can become so pronounced that the ball rollers ultimately even snap out of their cage pockets which are open on one side, via the elastically yielding pocket tabs, and stand transversely with respect to their raceways, with the result that destruction of the bearing cage and premature failure of the bearing occur. The ball rollers within a bearing cage of this type likewise have no possibility to orient themselves to the respective contact angle in the case of mixed radial and axial loading of the bearing, without contact between the ball rollers and the side ring of the snap action cage and the resulting disadvantageous consequences likewise occurring.

SUMMARY OF THE INVENTION

Proceeding from the described disadvantages of the known prior art, the invention is therefore based on the object of designing a radial roller bearing, particular a single track ball roller bearing, which is configured with a plastic bearing cage, by way of which sufficient axial guidance of the ball rollers is ensured at all times, even at low bearing rotational speeds or at a high bearing acceleration, and transverse positioning of the ball rollers in their raceways can be avoided, and which plastic bearing cage affords the possibility that the ball rollers are automatically oriented to the respective bearing contact angle without contact with the bearing cage, the case of mixed radial and axial loading of the bearing.

According to the invention, this object is achieved in a radial roller bearing with a plastic bearing cage that comprises two axially divided pocket cage halves of substantially mirror-symmetrical configuration which can be assembled positively, nonpositively or with a material-to-material fit via complementary connecting elements which are arranged so as to lie opposite one another on their dividing faces, and form a separate cage pocket in the mounted state for each ball roller, which cage pocket encloses said ball roller completely, and in which cage pocket the ball rollers have a defined two-sided axial tilting clearance for automatic orientation to the respective bearing contact angle via low-friction linear contacts between their side faces and those longitudinal webs of the cage pockets which lie opposite them.

According to another embodiment the contour of the cage pockets corresponds substantially to the cross-sectional contour of the ball rollers, the spacing between the longitudinal webs of the cage pockets being greater, however, than the extent of the width of the ball rollers between their side faces. Here, the transverse webs between the cage pockets are of arched configuration in accordance with the diameter of the ball rollers or with the radius of theft running faces and are connected via rounded transition regions to the longitudinal webs of the cage pockets.

Moreover, the radial roller bearing which is configured according to the invention is also distinguished by the fact that the linear contacts between the side faces of the ball rollers and the longitudinal webs of the cage pockets can preferably be produced via compensator webs, which are integrally formed onto the inner sides of the longitudinal webs, extend over the entire diameter of the side faces of the ball rollers and are wedge-shaped in profile cross-section. Here, the height of these wedge-shaped compensator webs corresponds in each case approximately to the spacing of the side faces of the ball rollers from those longitudinal webs of the cage pockets which lie opposite, a small air gap remaining between the compensator webs and the side faces of the ball rollers, however, in order to avoid permanent contact between the ball rollers and the bearing cage. For as long a guidance length as possible, moreover, the crest lines of the compensator webs are advantageously arranged on the pitch circle of the ball rollers and are of rounded configuration in order to prevent premature wear.

It is a further feature of the radial roller bearing which is configured according to the invention that the axial tilting clearance corresponds to an angular range of up to 35° on both sides of the longitudinal center axes of the ball rollers for automatic orientation of the ball rollers to the respective bearing contact angle within the cage pockets. As a result of the arrangement of the longitudinal webs of the cage pockets, which is spaced apart from the side faces of the ball rollers, the ball rollers can therefore perform axial tilting movements without contact with the bearing cage in a pivoting range of overall approximately 70°, which is delimited by the surfaces of the compensator webs on the longitudinal webs of the cage pockets.

As an advantageous refinement of the radial roller bearing which is configured according to the invention, that the complementary connecting elements which are arranged so as to lie opposite one another on the dividing faces of the pocket cage halves are preferably configured on one cage half as journals, which can be pressed into corresponding holes on the other cage half and can be connected to said holes by ultrasonic welding. As an alternative to this, however, it is also possible to connect the two cage halves by way of suitable latching elements on their dividing faces or by adhesive bonding, or to combine the stated connection types with one another.

In comparison with the roller bearings which are known from the prior art, the radial roller bearing of the present invention has the advantage that it has a plastic bearing cage, which can be assembled from two mirror-symmetrical parts, cannot be dismantled and by way of which it is possible in a simple way to arrange the ball rollers in the same completely enclosing cage pockets and to guide them axially in such a way that the tumbling movements of the ball rollers in the cage pockets, which occur at low bearing rotational speeds or at high bearing acceleration, are avoided effectively. At the same time, it is possible, as a result of low-friction linear contacts between the ball rollers and the bearing cage and as a result of defined axial tilting clearances within the cage pockets, that the ball rollers are oriented automatically to the respective contact angle of the ball roller bearing without contact with the bearing cage.

BRIEF DESCRIPTION OF THE DRAWINGS

One preferred embodiment of the radial roller bearing which is configured according to the invention will be explained in greater detail in the following text with reference to the appended drawings, in which.

DETAILED DESCRIPTION OF THE DRAWINGS

Figure 1:
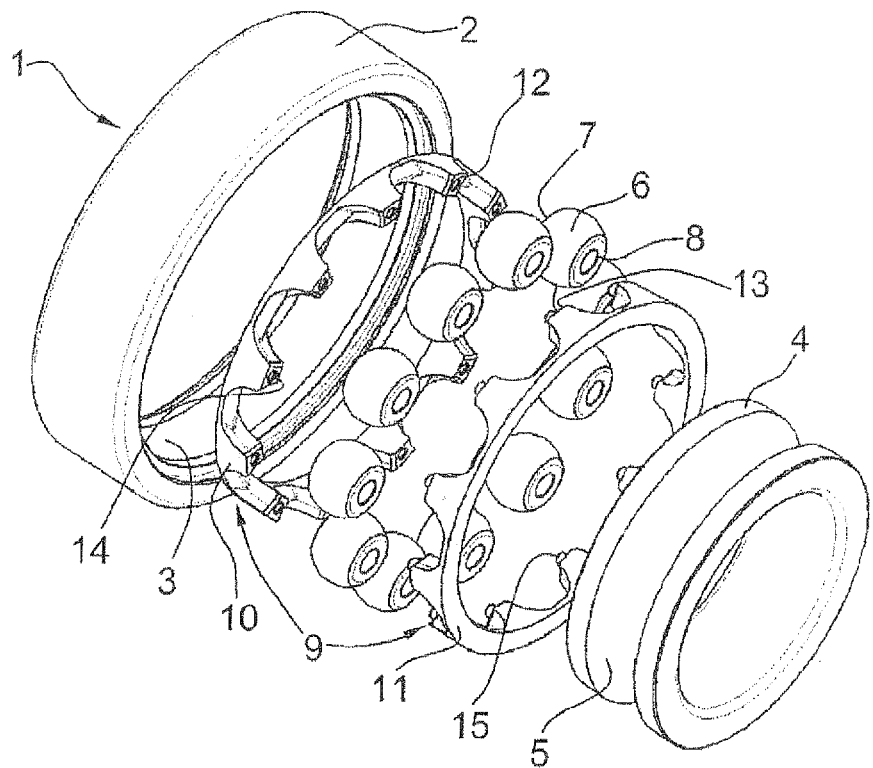
FIG. 1 shows an overall view of a ball roller bearing which is configured according to the invention, in an exploded illustration.

A radial roller bearing, which is configured as a single track ball roller bearing 1, is clearly apparent from FIG. 1. The radial roller bearing 1 comprises substantially an outer bearing ring 2 with an inner groove raceway 3, an inner bearing ring 4 with an outer groove raceway 5, and a multiplicity of ball rollers 6, which roll between the bearing rings 2, 4 in the groove raceways 3, 5 and in each case have two side faces 7, 8 that are flattened symmetrically from a basic ball shape and are arranged parallel to one another. It can likewise be seen in FIG. 1 that the ball rollers 6 are held at uniform spacings from one another in the circumferential direction by a plastic bearing cage 9 which, according to the invention, comprises two axially divided pocket cage halves 10, 11 of substantially mirror-symmetrical configuration which can be assembled positively, nonpositively or with a material-to-material fit via complementary connecting elements 14, 15 which are arranged so as to lie opposite one another on their dividing faces 12, 13.

Figure 2:
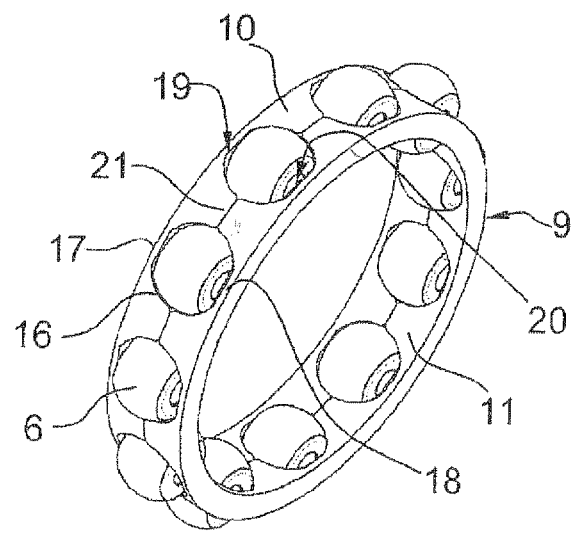
FIG. 2 shows a three-dimensional illustration specifically of the mounted plastic bearing cage, which is filled with ball rollers, of the ball roller bearing which is configured according to the invention.

Moreover, it becomes clear from FIG. 2 that the two pocket cage halves 10, 11 form a separate cage pocket 16 in the mounted state for each ball roller 6. The cage pocket 16 encloses the ball roller 6 completely and in the cage pocket 16, the ball rollers 6 have a defined two-sided axial tilting clearance 19, 20 for automatic orientation to the bearing contact angle via low-friction linear contacts between the side faces 7, 8 and longitudinal webs 17, 18 of the cage pockets 16 which lie opposite them. In a clearly discernible manner here, the contour of the cage pockets 16 corresponds substantially to the cross-sectional contour of the ball rollers 6. The spacing between the longitudinal webs 17, 18 of the cage pockets 16 is greater, however, than the extent of the width of the ball rollers 6 between the side faces 7, 8 and transverse webs 21 between the cage pockets 16 which are of arched configuration in accordance with the diameter of the ball rollers 6 being connected via rounded transition regions 22, 23 (shown in greater detail in FIGS. 4 and 5) to the longitudinal webs 17, 18 of the cage pockets 16.

Figures 3, 4:
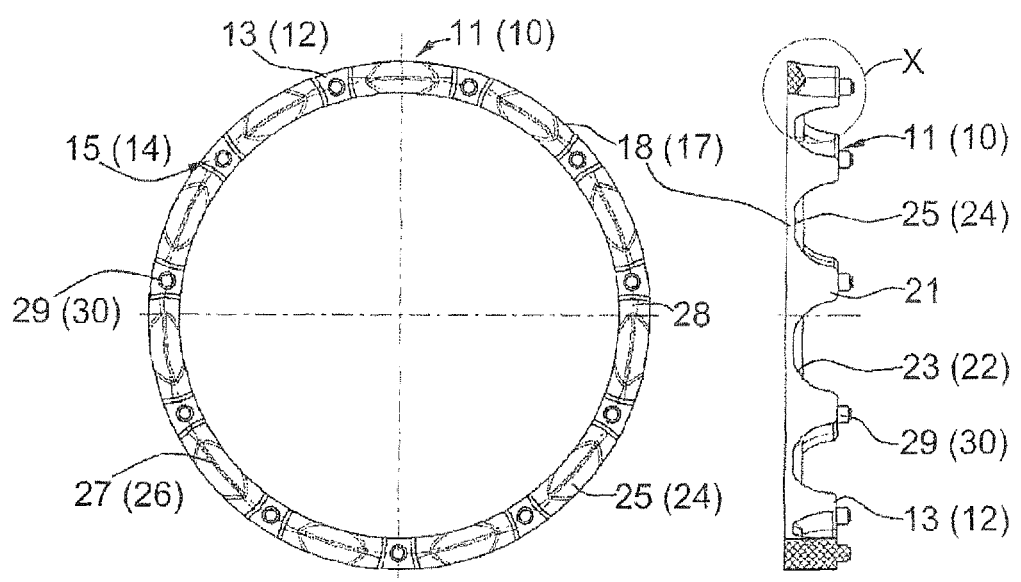
FIG. 3 shows a plan view of one cage half of the plastic bearing cage of the ball roller bearing which is configured according to the invention.
FIG. 4 shows the side view of the cage half of the plastic bearing cage of the ball roller bearing in accordance with FIG. 3 which is configured according to the invention.
Figure 5:
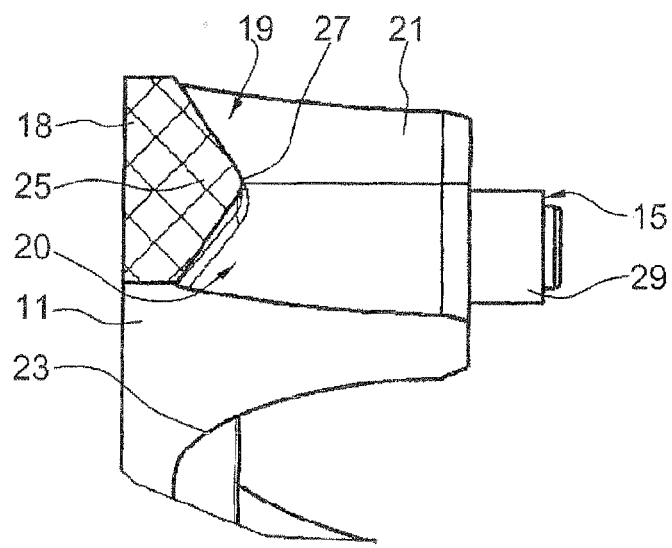
FIG. 5 shows an enlarged illustration of the detail X in the side view of the cage half of the plastic bearing cage according to FIG. 4.

Furthermore, FIGS. 3, 4 and 5 show that the linear contacts between the side faces 7, 8 of the ball rollers 6 and the longitudinal webs 17, 18 of the cage pockets 16 can preferably be produced via compensator webs 24, 25 which are integrally formed on the inner sides of the longitudinal webs 17, 18, extend over the entire diameter of the side faces 7, 8 of the ball rollers 6 and are of wedge-shaped configuration in profile cross-section. Here, FIG. 5 makes it clear that the wedge height of the compensator webs 24, on the inner sides of the longitudinal webs 17, 18 of the cage pockets 16 corresponds, in each case, approximately to the spacing of the side faces 7, 8 of the ball rollers 6 from the longitudinal webs 17, 18 of the cage pockets 16, which lie opposite the ball rollers, while it is indicated in FIG. 3 that the crest lines 26, 27 of the compensator webs 24, 25 are arranged on the pitch circle 28 of the ball rollers 6.

Finally, it is also apparent from FIGS. 1 and 5 that the axial tilting clearance 19, 20 corresponds to an angular range of approximately 35° on both sides of the longitudinal center axes of the ball rollers 6 for automatic orientation of the ball rollers 6 to the respective bearing contact angle within the cage pockets 16. The ball rollers can perform axial tilting movements without contact with the plastic bearing cage 8 in a pivoting range of a total of approximately 70°, which is delimited by the surfaces of the compensator webs 24, 25 on the longitudinal webs 17, 18 of the cage pockets 16. Here, the complementary connecting elements 14, 15 for the two cage halves 10, 11, which are arranged so as to lie opposite one another on the dividing faces 12, 13 of the pocket cage halves 10, 11, are configured on one cage half 11 as journals 29, which can be pressed into corresponding holes 30 on the other cage half 10 and can be connected to the holes 30 by ultrasonic welding.

LIST OF DESIGNATIONS

1 Ball Roller Bearing
2 Outer Bearing Ring
3 Groove Raceway in 2
4 Inner Bearing Ring
5 Groove Raceway in 4
6 Ball Rollers
7 Side Face on 6
8 Side Face on 6
9 Plastic Bearing Cage
10 Pocket Cage Half of 9
11 Pocket Cage Half of 9
12 Dividing Face on 10
13 Dividing Face on 11
14 Connecting Elements on 12
15 Connecting Elements on 13
16 Cage Pockets in 9
17 Longitudinal Web of 16
18 Longitudinal Web of 16
19 Axial Tilting Clearance in 16
20 Axial Tilting Clearance in 16
21 Transverse Webs of 16
22 Transition Region to 17
23 Transition Region to 18
24 Compensator Web on 17
25 Compensator Web on 18
26 Crest Line of 24
27 Crest Line of 25
28 Pitch Circle of 6
29 Journals on 12
30 Holes in 13

The invention claimed is:

1. A radial roller bearing, comprising:
an outer bearing ring having an inner groove raceway;
an inner bearing ring having an outer groove raceway;
a plastic bearing cage having two substantially symmetrical axially divided cage pocket halves with longitudinal webs and complementary connecting elements opposing each other on dividing faces of the cage pocket halves, the cage pocket halves being assembled positively, non-positively or with a material-to-material fit by the complementary connecting elements forming a plurality of cage pockets;
a plurality of ball rollers, which roil between the outer bearing ring and the inner bearing ring in the inner groove raceway and the outer groove raceway, having two side faces that are flattened symmetrically from a basic ball shape with axial tilting clearances for automatic orientation to a bearing contact angle via low-friction linear contacts between the side faces and the longitudinal webs of the cage which lie opposite axial tilting clearances, the ball rollers being arranged parallel to one another and being held uniformly spaced in a circumferential direction by the cage; and
compensator webs which are integrally formed on the inner sides of the longitudinal webs and are wedge-shaped as viewed in cross-section, each of the compensator webs extend over an entire diameter of respective side faces of the ball rollers, wherein linear contacts between the side faces of the ball rollers and the longitudinal webs of the cage pockets are formed by the compensator webs.

2. The radial roller bearing as claimed in claim 1, wherein the radial roller bearing is a single track ball roller bearing.

3. The radial roller bearing as claimed in claim 1, wherein the cage pocket halves each have a plurality of transverse webs extending at arched transition regions, between the longitudinal webs, the transverse webs have an arched configuration corresponding to a diameter of the ball rollers and the dividing faces on which the complementary connecting elements are configured are located at an end of each transverse web.

4. The radial roller bearing as claimed in claim 1, wherein the ball rollers have a cross-sectional contour and the cage pockets have a contour which corresponds substantially to the cross-sectional contour of the ball rollers with spacing between the longitudinal webs of the cage pockets being greater than a width of the ball rollers between the side faces of the ball rollers.

5. The radial roger bearing as claimed in claim 1, wherein the compensator webs have crest lines contacting a pitch circle of the ball rollers and a height of the wedge-shaped cross-section of the compensator webs corresponds approximately to a spacing of the side faces of the bag rollers.

6. The radial roller bearing as claimed in claim 5, wherein the axial tilting clearance corresponds to an angular range of up to 35°, which is delimited by surfaces of the compensator webs on both sides of a longitudinal center axis of the ball rollers for automatic orientation of the ball rollers to a bearing contact angle within the cage pockets.

7. The radial roller bearing as claimed in claim 1, wherein the complementary connecting elements are configured on one of cage pocket halves as journals and on another of the cage pocket halves as holes such that the journals of the one of the cage pocket halves can be pressed into the holes of the another of the cage pocket halves and can be connected to the holes by ultrasonic welding.

\* \* \* \* \*